United States Patent [19]

Ishida

[11] Patent Number: 5,060,628
[45] Date of Patent: Oct. 29, 1991

[54] GUIDE PULLEY BASE FOR WIRE SAW

[75] Inventor: Yasuhiro Ishida, Kyoto, Japan

[73] Assignee: Kabushiki Kaisha Dymosha, Kyoto, Japan

[21] Appl. No.: 676,534

[22] Filed: Mar. 28, 1991

[30] Foreign Application Priority Data

Apr. 4, 1990 [JP] Japan .................... 2-36261[U]

[51] Int. Cl.$^5$ .................... B28D 1/08
[52] U.S. Cl. .................... 125/21
[58] Field of Search .................... 125/21; 83/651.1, 661, 83/814, 816, 825

[56] References Cited

U.S. PATENT DOCUMENTS 4,765,307  8/1988  Kubo .................... 125/21

FOREIGN PATENT DOCUMENTS 222903  9/1989  Japan .................... 125/21

Primary Examiner—M. Rachuba
Attorney, Agent, or Firm—Fidelman & Wolffe

[57] ABSTRACT

A guide pulley base for wire saw comprising a primary support member, a secondary support member rotatably mounted on the primary support member, a primary grooved pulley rotatably supported on the primary support member in such a way that the rotational axial line of the second support member passes tangentially through the peripheral groove of the primary grooved pulley, and a secondary grooved pulley rotatably supported on the secondary support member in such a way that the rotational axial line of the second support member passes tangentially through the peripheral groove of the secondary grooved pulley.

The guide pulley base for wire saw is arranged between an object to be cut and a wire drive unit for guiding a cutting wire and smoothly turning the wire travel direction when an object to be cut such as ferroconcrete structure is cut off partially.

2 Claims, 2 Drawing Sheets

GUIDE PULLEY BASE FOR WIRE SAW

BACKGROUND OF THE INVENTION

The present invention relates to a guide pulley base for wire saw, which is arranged between an object to be cut and a wire drive unit for guiding a cutting wire and smoothly turning the wire travel direction when an object to be cut such as ferroconcrete structure is cut off partially.

U.S. Pat. No. 4,765,307 discloses a wire sawing method for horizontally cutting an object to be cut by using a guide pulley base for wire saw having a pair of pulleys on the same plane and a pair of guidance pulleys in parallel to each other, wherein a wire drive unit is movably disposed in front of the object to be cut, the guide pulley base is installed between the object to be cut and the wire drive unit, a cutting wire is endlessly reeved between the object to be cut and the wire drive pulley of the wire drive unit through the guide pulley base, and the wire drive unit is driven to make the cutting wire circularly travel while drawing the cutting wire in the opposite direction from the guide pulley base.

Further, U.S. Pat. No. 4,735,188 discloses another wire sawing method for vertically cutting the object to be cut, wherein a wire drive unit is movably disposed in front of the object to be cut, a cutting wire is endlessly reeved between the object to be cut and the wire drive pulley of the wire drive unit, and the wire drive unit is driven to make the cutting wire circularly travel while drawing the cutting wire in the opposite direction from the object to be cut.

However, in case of the horizontal or vertical wire sawing as mentioned above, if there exists no wide area in front of the object to be cut enough to movably dispose the wire drive unit due to such causes that there is an only small area, obstacles to the movable disposition of the wire drive unit or the like in front of the object to be cut, it is impossible to movably dispose the wire drive unit in front of the object to be cut. In this case, it is necessary to dispose the wire drive unit on such a place as is not in front of the object to be cut and install supplementary guide pulley bases between the object to be cut and the wire drive unit to turn the cutting wire to any desired direction.

Therefore, it is an object of the present invention to provide a guide pulley base for wire saw for turning the cutting wire at any desired angle and smoothly guiding it between the object to be cut and the wire drive unit according to the state of a cutting job site when the wire drive unit is disposed on a place which is not in front of the object to be cut.

SUMMARY OF THE INVENTION

The object as described above and further objects will accomplished by the invention.

According to this invention, there is provided a guide pulley base for wire saw comprising a primary support member, a secondary support member rotatably mounted on the primary support member, a primary grooved pulley rotatably supported on the primary support member in such a way that the rotational axial line of the second support member passes tangentially through the peripheral groove of the primary grooved pulley, and a secondary grooved pulley rotatably supported on the secondary support member in such a way that the rotational axial line of the second support member passes tangentially through the peripheral groove of the secondary grooved pulley.

In the structure above mentioned, the secondary support member is rotated against the primary support member about the rotational axial line of the second support member, whereby the primary grooved pulley and the secondary grooved pulley are disposed at any desired angle to each other. The cutting wire is reeved between the peripheral grooves of the primary grooved pulley and the secondary grooved pulley in S-shape fashion along the rotational axial line of the second support member, whereby the cutting wire is turned in the direction corresponding to the angle between the primary grooved pulley and the secondary grooved pulley. Since the cutting wire is necessarily turned on the rotational axial line of the second support member, it is able to be smoothly guided without regard to the angle between the primary grooved pulley and the secondary grooved pulley.

In the present invention as described above, there may be provided a structure, wherein the two primary grooved pulleys are rotatably supported on the primary support member on the same plane and the two secondary grooved pulleys are rotatably supported on the secondary support member on the same plane, whereby the tensile and loose sides of the cutting wire are able to be guided together at the same time in any desired direction, in which the tensile side being a part of the cutting wire travelling from the object to be cut to the wire drive unit and the loose side being a part of the cutting wire travelling from the wire drive unit to the object to be cut.

BRIEF DESCRIPTION OF THE DRAWINGS

The present invention is more clearly illustrated in the accompanying drawings, wherein.

DETAILED DESCRIPTION OF THE PREFERRED EMBODIMENTS

The embodiment of the present invention will be described hereinafter with reference to the attached drawings.

Figure 1:
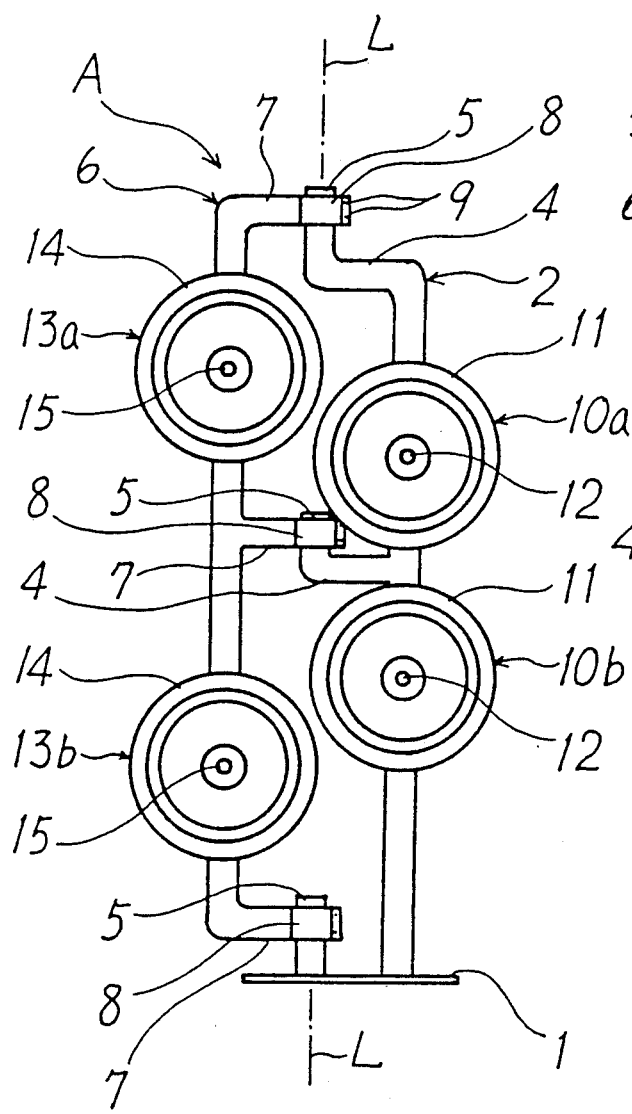
FIGS. 1 and 2 are front and side views, respectively showing an embodiment of the guide pulley base for wire saw according to the present invention.
Figure 2:
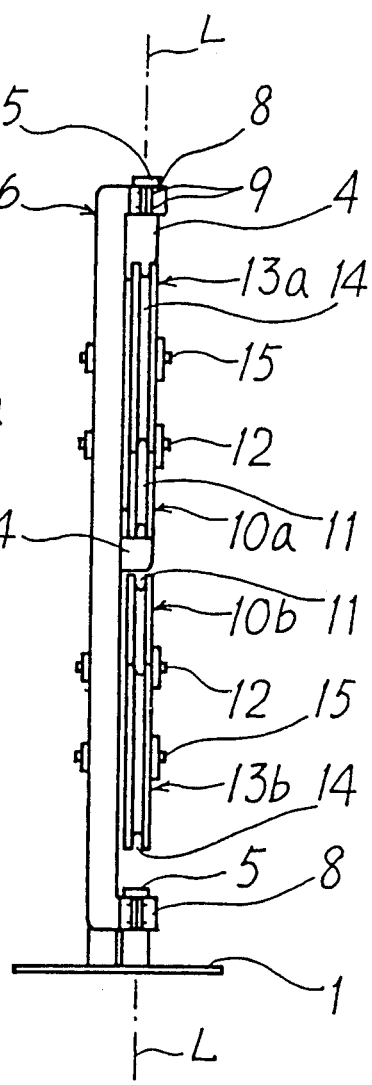

In the guide pulley base A shown in FIGS. 1 and 2, a F-shaped support 2 is vertically disposed on a square base plate 1, curved slotted holes 3 (shown only in FIG. 3) are bored in the four corners of the square base plate 1 and supporting shafts 5 are coaxially disposed on the square base plate 1 and the branches 4 of the F-shaped support 2. Such members as those from the square base plate 1 to the supporting shafts 5 above mentioned work together to make a primary support member according to the present invention.

Further, an E-shaped support 6 is rotatably mounted on the primary support member, in which clamps 8 are coaxially connected to the branches 8 of the E-shaped support 6, each supporting shaft 5 is rotatably fitted into each clamp 8 and each clamp 8 is closed by screws 9. Such members as those from the E-shaped support 6 to the screws 9 above mentioned work together to make a secondary support member according to the present invention.

Primary grooved pulleys 10a, 10b are rotatably supported on the upper and lower sides of the F-shaped support 2 through rotary shafts 12, on the same plane and in such a way that the central axial line L in the supporting shafts 5, the central axial line L being also the rotational axial line of the E-shaped support 6, passes tangentially through the peripheral grooves 11 of the primary grooved pulleys 10a, 10b; and similarly, secondary grooved pulleys 13a, 13b are rotatably supported on the upper and lower sides of the E-shaped support 6 through rotary shafts 15, at the positions adjacent to the primary grooved pulleys 10a, 10b, on the same plane and in such a way that the central axial line L passes tangentially through the peripheral grooves 14 of the secondary grooved pulleys 13a, 13b.

FIGS. 1 and 2 show the case where the primary grooved pulleys 10a, 10b and the secondary grooved pulleys 13a, 13b are disposed on the same plane and thus, at an angle of 180 degrees to each other.

Figure 3:
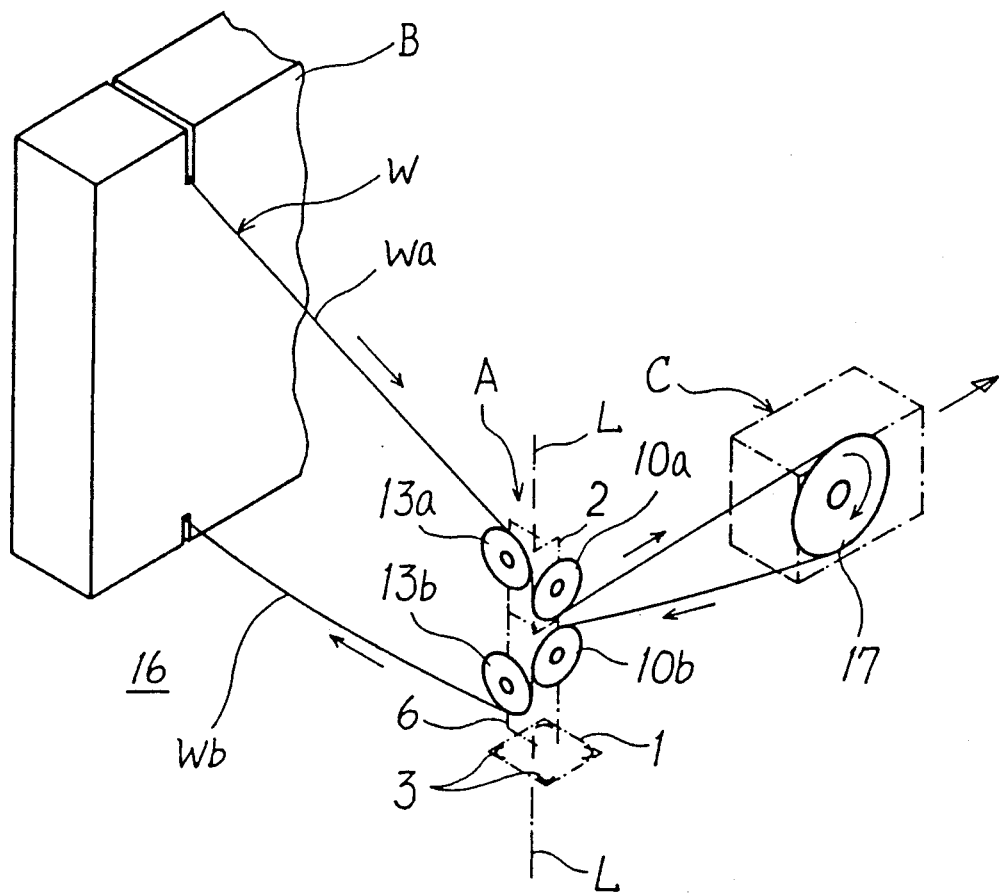
FIG. 3 is a perspective view for assistance in explaining the method of using the guide pulley base for wire saw shown in FIGS. 1 and 2.

In FIG. 3, the guide pulley base A is fixed on a floor 16 with anchors (not shown) in front of an object to be cut B which is vertically constructed like a wall, the anchors being struck into the floor through the curved slotted holes 3 of the square base plate 1, the primary grooved pulleys 10a, 10b and the secondary grooved pulleys 13a, 13b are disposed at an angle of about 90 degrees to each other, and a wire drive unit C is movably disposed on the floor 16, being 90 degrees away from the object to be cut B about the guide pulley base A. A cutting wire W is reeved between the upper and lower sides of the object to be cut B and the wire drive pulley 17 of the wire drive unit C by way of the guide pulley base A, in which the tensile side Wa of the cutting wire W is reeved between the outside of the secondary grooved pulley 13a and the inside of the primary grooved pulleys 10a in S-shape fashion; and the loose side Wb of the cutting wire W is reeved between the outside of the secondary grooved pulley 13b and the inside of the primary grooved pulleys 10b in S-shape fashion, the tensile side Wa and the loose side Wb being turned together on the central axial line L by an angle of about 90 degrees.

In the structure above mentioned, when the wire drive unit C is moved in the opposite direction from the guide pulley base A and the wire drive pulley 17 is rotated in the clockwise direction, the cutting wire W circularly travels in the clockwise direction at a desired speed under tension to vertically cut off the object to be cut B. Although not shown and not described, it is also possible to provide another wire sawing method for horizontally cutting the object to be cut B by using the guide pulley base A and that another guide pulley base according to the prior arts above mentioned which is installed between the object to be cut B and the guide pulley base A.

As many apparently widely different embodiments of this invention may be made without departing from the spirit and scope thereof, it is to be understood that the present invention is not limited to the specific embodiments thereof except as defined in the appended claims.

What is claimed is:

1. A guide pulley base for wire saw comprising a primary support member, a secondary support member rotatably mounted on the primary support member, a primary grooved pulley rotatably supported on the primary support member in such a way that the rotational axial line of the second support member passes tangentially through the peripheral groove of the primary grooved pulley, and a secondary grooved pulley rotatably supported on the secondary support member in such a way that the rotational axial line of the second support member passes tangentially through the peripheral groove of the secondary grooved pulley.

2. A guide pulley base for wire saw according to claim 1, wherein another primary grooved pulley is rotatably supported on the primary support member on a same plane and another secondary grooved pulley is rotatably supported on the secondary support member on a same plane with said secondary grooved pulley.

* * * * *